United States Patent Office 2,844,439
Patented July 22, 1958

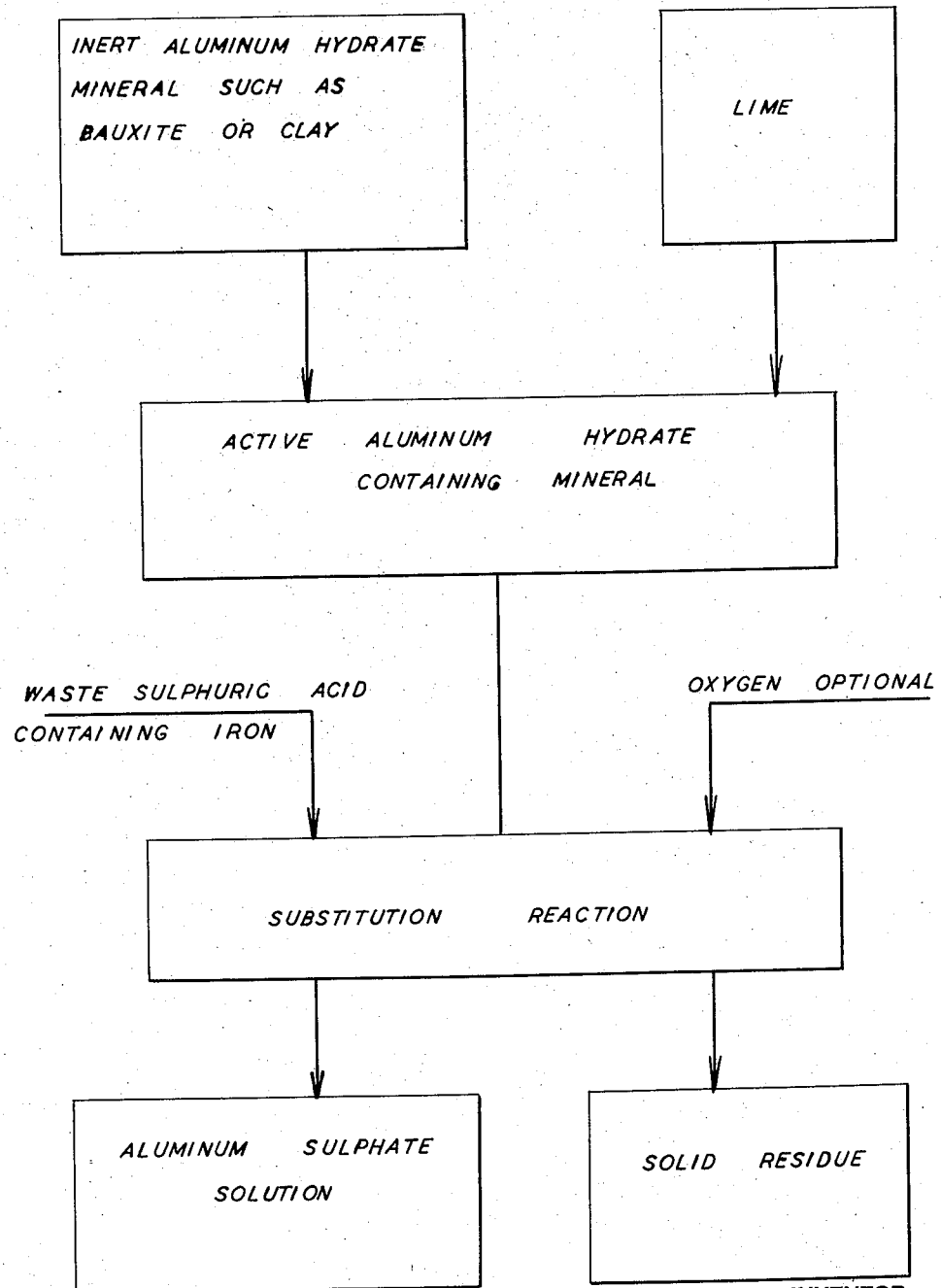

2,844,439

PRODUCTION OF ALUMINUM SULPHATE FROM WASTE MATERIALS

Chris Schurr, Philadelphia, Pa.

Application September 10, 1956, Serial No. 608,937

4 Claims. (Cl. 23—123)

The present invention relates to processes of production of aluminum sulphate from relatively inert aluminum hydrate containing minerals such as bauxite or clay and from waste sulphuric acid containing iron.

A purpose of the invention is to obtain economical and efficient conversion of relatively inert aluminum hydrate containing minerals such as bauxite and clay into aluminum sulphate.

A further purpose is to dispose of waste sulphuric acid, particularly waste sulphuric acid containing iron.

A further purpose is to treat aluminum hydrate containing minerals in finely divided form with finely divided lime in water, then react the above product with sulphuric acid solution containing iron and finally to separate the aluminum sulphate produced from the solid residue.

A further purpose is to proportion the lime to yield about 3 molecular equivalents of calcium to 2 molecular equivalents of aluminum in the reaction product of lime with inert aluminum hydrate mineral.

A further purpose is to oxidize the iron so as to produce a ferric salt and eliminate ferrous iron.

A further purpose is to aerate the sulphuric acid reaction solution and proportion the reacting ingredient to maintain a pH on the acid side of 3.5.

A further purpose is to proportion the relative quantities of sulphuric acid to maintain the pH of the effluent on the basic side of 5.5.

A further purpose is to add the lime-aluminum-hydrate reaction product to the sulphuric acid solution, filter, roast the solid residue to decompose the iron sulphate, and then leach aluminum sulphate from the residue.

Further purposes appear in the specification and in the claims.

Considerable difficulty has been encountered in obtaining an economical conversion of relatively inert alumina or aluminum hydrate containing minerals to soluble aluminum salts.

There has also been a great deal of difficulty in some areas in disposing of waste sulphuric acid containing iron, such as spent acid. It has been necessary for some industries to employ acid recovery systems in order to protect the streams and rivers against acid contamination.

I have discovered an economical and efficient process of both converting relatively inert aluminum hydrate containing minerals such as bauxite or clay into soluble aluminum sulphate and also disposing of spent sulphuric acid.

In accordance with the present invention, the relatively inert aluminum hydrate containing minerals such as bauxite or clay are treated with lime to produce active aluminum hydrate or aluminate which dissolves readily in weak acid. This active aluminum hydrate is then reacted with spent sulphuric acid containing iron sulphate under proper conditions to convert the waste sulphate contained in the spent acid and the iron sulphate into aluminum sulphate and obtain a harmless inert solid product.

The invention offers a number of distinct advantages:

(1) Stream pollution is avoided by the economical conversion of waste acid and iron liquors both in the concentrated form resulting as spent steel mill pickle liquor and titanium copperas, and also in the dilute form such as sulphuric acid rinse water.

(2) The presently used process of treating waste sulphuric acid, usually involving the neutralization with lime, is costly and produces a sludge which in some cases itself presents a waste disposal problem. This prior art process produces no economically useable by-product. The present invention, on the other hand, yields aluminum sulphate, a valuable product.

(3) The solid material produced by treatment with bauxite or clay is an inert, harmless material which dries rapidly and is easily handled. It is not toxic. It merely consists of hydrated calcium sulphate, hydrated ferric oxide and silica. It can be used safely on soil or otherwise.

(4) The aluminum sulphate obtained from the effluent solution is a very widely used raw material and has a very large market. Unlike other sulphates which might be obtained by neutralizing spent sulphuric acid, which have small markets, aluminum sulphate can be disposed of in large quantities.

(5) The current price of aluminum sulphate and the historic price throughout the years are sufficiently high to more than pay for the required lime and bauxite or clay, so that the operation can be conducted at a profit.

(6) Whereas untreated alumina minerals such as bauxite or clay are relatively inert and will not displace iron in iron sulphate solutions, the present invention relies upon treating the bauxite or clay to render it more soluble, and utilizes the reaction with the waste sulphuric acid to assist in the interchange. A reaction of this character would not be economical with sulphuric acid of full value because of the large proportion which would be converted to calcium sulphate, but is economical with waste sulphuric acid.

(7) The raw materials required, that is, bauxite, clay and lime, are among the cheapest materials available and are widely distributed. The availability of the bauxite or clay is increased because the presence of iron and silica as an impurity is not important.

(8) By carrying on the process carefully, the amount of iron present as an impurity in the aluminum sulphate can be controlled and reduced to any desired low value.

The figure is a flow diagram useful in explaining the invention.

The reaction will be better understood when it is recognized that the relative solubilities of aluminum, ferric and ferrous ions are very important in the present invention. Proceeding from the acid side toward the basic side, these ions tend to hydrolyze at the following pH levels:

Ferric _____ 2.0
Aluminum _____ 4.1
Ferrous _____ 5.5

By pretreating the aluminum hydrate containing mineral with lime, it is converted to a form which is highly soluble in sulphuric acid and which readily replaces ferric iron or dissolves in weak sulphuric acid. The aluminum hydrate is made available to replace the iron or unite with the acid when it is released from combination with calcium hydroxide at the time the calcium hydroxide unites with the sulphate ions to form calcium sulphate. This is not confined to the use of tricalcium aluminate proportions, as any one of the calcium-aluminum hydrates may be formed.

EXAMPLE 1

In carrying out the process of the invention according to the preferred embodiments, the basic material which is to be used to neutralize the sulphuric acid and precipitate the iron content of the waste, is prepared by mixing chemical lime and hydrated alumina containing mineral both in finely divided form, preferably through 300 mesh per linear inch. The proportions are preferably adjusted according to the aluminum content of the material so that the product contains about three molecular equivalents of lime and two molecular equivalents of aluminum. The reaction is carried out preferably at room temperature, desirably with stirring, suitably in an open reaction tank equipped with a stirrer. The product obtained is a very flocculent hydrated compound which easily suspends in water and readily reacts with weak acid values.

Table 1 lists the theoretical proportions used, before adjustment for impurities.

Table 1

|  | Molecular Weight | Units | Weights (pounds) | |
|---|---|---|---|---|
|  |  |  | Bauxite Mixture | Clay Mixture |
| Lime | 56 | 3 | 168 | 168 |
| Bauxite | 138 | 1 | 138 | |
| Kaolin | 258 | 1 | | 258 |
| Water for Compound a | 18 | 4 | 72 | 72 |
| Hydrated Compounds | | | 378 | 498 | a This does not include water in which materials are mixed to prepare the mixture.

A typical bauxite as used for the reaction has the following analysis by weight:

| | Percent |
|---|---|
| Silica | 29.2 |
| Alumina | 53.3 |
| Titania | 2.7 |
| Ferric oxide | 1.9 |
| Water | 12.0 |
| | 99.1 |

A typical clay as used for the reaction has the following analysis by weight:

| | Percent |
|---|---|
| Silica | 45.28 |
| Alumina | 37.31 |
| Ferric oxide | 1.23 |
| Titanium oxide | 2.14 |
| Calcium oxide | 0.09 |
| Magnesium oxide | 0.11 |
| Sodium oxide | 0.15 |
| Potassium oxide | 0.16 |
| Moisture | 13.51 |
| | 99.98 |

A typical lime as used for the reaction has the following analysis by weight:

| | Percent |
|---|---|
| Calcium oxide | 97.50 |
| Calcium carbonate | 0.80 |
| Silica | 0.66 |
| Ferric oxide and aluminum oxide | 0.49 |
| Magnesium oxide | 0.36 |
| Sulphur trioxide | 0.19 |
| | 100.00 |

Using the above bauxite and the above lime the proportions for mixing are preferably 52 percent by weight of bauxite and 48 percent by weight of lime.

Using the above clay, the proportions for mixing are preferably 61 percent by weight of clay and 39 percent by weight of lime.

Of course, it will be evident that the proportions may be varied and based on alumina ($Al_2O_3$) and lime (CaO) the proportion of alumina may vary from 28 percent to 48 percent by weight and the proportion of lime may vary from between 72 percent and 52 percent by weight.

Using strong sulphuric acid and concentrated iron sulphate in the acid, as obtained, for example, in waste pickle liquor, the procedure for reaction of the basic reaction product of lime and alumina with the acid and iron sulphate solutions is as follows:

The acid waste and the slurry of the basic material are brought together in a suitable tank while agitated and aerated, preferably by bubbling in air. The rates of addition of the waste acid solution and the slurry are controlled so that the air obtains contact with the iron salt in the waste acid and oxidizes the iron content from ferrous to ferric iron. The addition of the reacting ingredients is also regulated and the proportions controlled so that the hydrogen ion concentration in the reacting solution is kept on the acid side of pH 3.5. This is the most valuable pH range where ferric sulphate is present from the standpoint of reaction to form aluminum sulphate and insolubility of the ferric residue.

Using a typical spent liquor from continuous pickling operations, and assuming 100% conversion, the weight relations are as shown in Table 2.

Table 2

| | Molecular Weight | Units | Weights (pounds) | |
|---|---|---|---|---|
| | | | Bauxite Mixture | Clay Mixture |
| Free Sulphuric Acid (Anhydrous Basis) | 152 | 4 | 608 | 608 |
| Ferrous Sulphate (Anhydrous Basis) | 98 | 2 | 196 | 196 |
| Water | 18 | 173 | 3,119 | 3,119 |
| Spent Pickle Liquor | | | 3,923 | 3,923 |
| Air as Oxygen | 16 | 2 | 32 | 32 |
| Calcium Aluminate Mixture | | 1 | 378 | 498 |
| Total Input | | | 4,333 | 4,453 |
| Aluminum Sulphate (18 Mol.) | 666 | 1 | 666 | 666 |
| Solids: | | | | |
| Ferric Hydrate | 214 | 2 | 427 | 427 |
| Calcium Sulphate | 172 | 3 | 517 | 517 |
| Silica | 96 | 2 | | 192 |
| | | | 944 | 1,136 |
| Water to Evaporate | | | 2,723 | 2,651 |
| Total Output | | | 4,333 | 4,453 |

The above reaction is preferably carried out at room temperature. After completion of the reaction, the reaction mixture may be heated to hasten settling of solids and assist filtration, if desired. On the other hand, the mixture may be allowed to settle to permit filtration. The mixture is then filtered. The filter cake consists essentially of ferric hydrate, calcium sulphate and silica plus any incidental impurities which may be characteristic of the particular raw material.

The filtrate consists primarily of aluminum sulphate with some calcium sulphate and any iron that has not been removed in the reaction. If the end point of the reaction is carefully controlled, the iron content can be reduced to any desired level. The traces of calcium sulphate will precipitate first in the evaporation step because of the low solubility of calcium sulphate and the effect of the high concentration of sulphate ions. If manganese is present in quantities sufficient to discolor the end product, that metal and any heavier metals may be removed by treatment with aluminum scrap which has been washed with caustic. The product can be sold as crude aluminum sulphate or can be purified by recrystallization or otherwise, as desired.

The proportions may vary widely from the proportions mentioned above, and the reaction can be carried out satisfactorily using any sulphuric acid concentration in the reaction mixture which maintains a pH on the acid side of 3.5. For best results, the solution should not be allowed to pass on the basic side of pH 3.5 if ferrous iron in substantial quantities is not present.

If desired, the oxidizing agent may be oxygen, hydrogen peroxide or ozone instead of air and catalysts may be used to promote the speed of oxidation.

EXAMPLE 2

Where the solution of sulphuric acid and iron sulphate is diluted, as in acid rinse water, the technique above suggested in Example 1 will be modified. If it is desired to proceed by oxidizing the iron to ferric iron, the tanks in which the rinse water is stored prior to neutralization may be equipped with any type of aerating device through which air is blown in small bubbles arranged so that the time of passage of the bubbles through the solution is as long as possible to permit absorption.

If it is not desired to oxidize the iron, the waste sulphuric acid and iron sulphate solution is mixed with the basic material. This may be accomplished either by mixing a slurry of the basic lime-alumina reaction product with the waste acid liquor, or by passing the waste acid liquor through a bed of the filter cake of basic lime-alumina material. The effluent solution is discharged or reused as long as the pH does not fall below 5.5. When the basic material is no longer capable of keeping the pH above 5.5 (the point at which ferrous iron becomes soluble), it is preferably used in the treatment of stronger liquor with oxidization of the iron, or to pretreat strong liquor after previously treating and while it is being held for processing to utilize the alumina content.

The proportions used in reacting waste acid rinse water with basic lime-alumina cannot precisely be predicted. The pH should be raised to 5.5. Rinse water may vary between $\frac{1}{10}$ and $\frac{1}{20}$ of the content of strong pickle liquor.

EXAMPLE 3

An alternate method of treatment of the strong acid waste, such as sulphuric acid pickle liquor, is to rapidly add the basic lime-alumina material in powdered form to the solution of sulphuric acid and iron sulphate without oxidation while keeping the pH above 5.5 where ferrous iron is present.

The procedure is stopped when the solution becomes saturated and no longer keeps ferrous iron out of solution. The water contains only a small amount of calcium sulphate and it is filtered off for reuse or disposal. The solid mass contains a complex calcium-aluminum-iron sulphate. The solid mass is roasted at a temperature between 900° and 1100° F. to decompose the iron sulphate. The roasted product is then leached and aluminum sulphate recovered.

This method has the disadvantage that more aluminum values are lost, but it has the advantage of being more widely applicable.

It will be evident that in accordance with the present invention a very simple and inexpensive conversion of relatively inert aluminum minerals into aluminum sulphate is obtained.

In view of my invention and disclosure, variations and modifications to meet individual whim or particular need will doubtless become evident to others skilled in the art, to obtain all or part of the benefits of my invention without copying the process shown, and I, therefore, claim all such insofar as they fall within the reasonable spirit and scope of my claims.

Having thus described my invention, what I claim as new and desire to secure by Letters Patent is:

1. The process of treating inert aluminum hydrate containing mineral, which comprises reacting finely divided inert aluminum hydrate mineral with finely divided quick lime in water, then reacting the above product with sulphuric acid solution containing iron while oxidizing the iron to ferric iron and proportioning the reacting ingredients to maintain a pH on the acid side of 3.5, and separating the aluminum sulphate produced from the solid residue.

2. The process of claim 1, in which the proportion of quick lime is controlled to yield about three molecular equivalents of calcium to two molecular equivalents of aluminum in the reaction product of quick lime with inert aluminum hydrate mineral.

3. The process of treating inert aluminum hydrate containing mineral, which comprises reacting finely divided inert aluminum hydrate mineral with finely divided quick lime in water, then reacting the above product with sulphuric acid solution containing iron while maintaining the iron in ferrous condition and proportioning the reacting ingredients to maintain a pH on the basic side of 5.5, and separating the aluminum sulphate produced from the solid residue.

4. The process of treating inert aluminum hydrate containing mineral, which comprises reacting finely divided inert aluminum hydrate mineral with finely divided quick lime in water, adding the lime-aluminum hydrate reaction product to a sulphuric acid solution containing iron while maintaining the iron in the ferrous condition and proportioning the reacting ingredients to maintain a pH on the basic side of 5.5, filtering, roasting the solid residue to decompose iron sulphate, and leaching aluminum sulphate from the residue.

References Cited in the file of this patent
UNITED STATES PATENTS

| | | |
|---|---|---|
| 1,170,418 | Coolbaugh et al. | Feb. 1, 1916 |
| 1,222,960 | McKee | Apr. 17, 1917 |
| 1,252,648 | Barnett et al. | June 8, 1918 |
| 1,945,172 | Wilson | Jan. 30, 1934 |
| 2,448,425 | Francis | Aug. 31, 1948 |

OTHER REFERENCES

Pickle Liquor Utilization, Chemical Engineering, March 1949, pages 144–147.